INVENTORS
MICHAEL W. McKAY
JOSEPH REED

BY

ATTORNEY.

United States Patent Office 3,077,594
Patented Feb. 12, 1963

3,077,594
DOPPLER NAVIGATOR LAND-WATER
CORRECTOR
Michael W. McKay, Tarrytown, and Joseph Reed, New
Rochelle, N.Y., assignors to General Precision, Inc., a
corporation of Delaware
Filed Jan. 25, 1960, Ser. No. 4,466
9 Claims. (Cl. 343—8)

This invention relates to microwave Doppler radar instruments, and particularly to apparatus for providing automatic correction over the error introduced in such an airborne instrument when passing over a shore line.

Doppler navigation instruments for aircraft employ several narrow beams of microwave radiation. These beams are directed obliquely toward the earth and, by measurement of the Doppler frequency changes of their echoes, the aircraft's ground track direction and speed can be found.

The aircraft's speed may change, changing the received Doppler frequency information. That portion of the receiver which measures the Doppler frequency must therefore be adapted to lock to the incoming frequency and to track it as it changes. This component of the receiver is termed the frequency tracker, and can be constructed to measure the center frequency of the received Doppler spectrum with an accuracy of 0.1%.

The calibration constant of the frequency tracker is the ratio of the measured Doppler center frequency to the aircraft speed. For a given instrument as installed this ratio is almost exactly constant when flying at any speed over any kind of land, at a given angle of beam incidence. However, when flying over water the calibration constant is, in general, different by an amount which is of the order of 1%. Since this error is ten times the possible accuracy of the frequency tracker, control of the error becomes important. The exact amount of this error in a given microwave beam depends principally on the angle of incidence of the beam at the water, and on the sea state, or roughness and shape of the water surface. When the angle of incidence is fixed by the design, only the nature of the water surface affects the amount of error.

As an example of a microwave beam used in such Doppler navigation instruments, a beam of microwave energy having a width in the direction along the ground track of, say, 4°, is directed downward and forward from the aircraft toward the ground track at an incident angle of 28°. The amplitude distribution across this beam is Gaussian to a first approximation.

The relation between the Doppler frequency in the echo and the angle of incidence, $\psi$, is $$f_d = \frac{2V}{\lambda} \sin \psi \quad (1)$$

in which $f_d$ is the Doppler frequency, $V$ is the aircraft velocity parallel to the ground track relative to the earth and $\lambda$ is the wavelength of the microwave beam. Since the path from the aircraft to the earth varies throughout the beam, being longer at the larger angles of incidence, the return signal is slightly weaker at these larger angles than at the smaller angles. This results in the echo frequency spectrum, plotted as an approximately Gaussian curve with power densities as ordinates and frequencies as abscissae, becoming skewed with the maximum moved toward the lower frequencies. This skewing occurs in all conventional Doppler radar instruments of the kind described, but is negligible in amount over land.

It has been found that the reflection of a microwave beam normal to a calm water surface is almost complete, with little scattering. As the water surface becomes rougher and less specular for the wavelengths of interest, more scattering occurs. The scattering is of such a nature that the reflection or echo strength of a microwave beam, as observed at the aircraft, decreases rapidly as the angle of incidence is increased. At angles of incidence of interest, between 25° and 30°, the high rate of decrease of echo strength skews the frequency spectrum materially. As a result, conventional frequency tracker operation to find the spectrum center gives a result about 1% low. The principal purpose of this invention is to provide means for automatically correcting for errors introduced by overwater operation.

Instrumentation for this purpose includes a resonant frequency tracker of the type using a frequency-modulated heterodyning oscillator. To carry out the invention the oscillator is additionally frequency modulated at a second, different modulation rate. The frequency tracker filter output is detected and applied to a gated phase detector from which a signal is secured having an amplitude which differs in overwater operation from overland operation. This signal, herein termed a land-water signal, is then employed to correct the frequency output of the frequency tracker loop.

A further understanding of this invention may be secured from the detailed description and drawings, in which:

FIGURES 4 and 5 are curves illustrating resonant frequency tracker operation.

Figure 1:
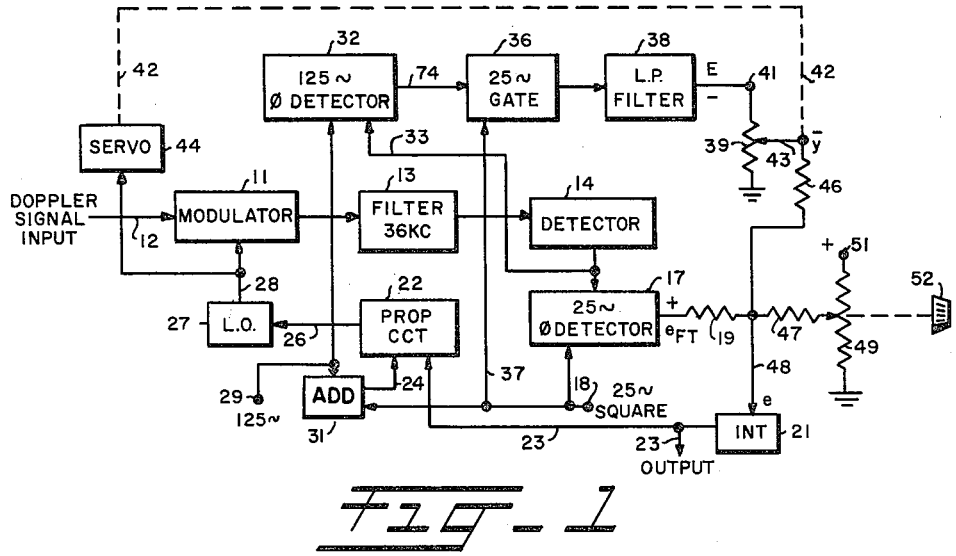
FIGURE 1 is a block diagram of the circuit of the invention.

Referring now to FIGURE 1, a modulator 11 receives a Doppler signal at input 12. This signal is to be tracked and the center frequency is to be measured. The modulator output is applied to a filter 13 having a narrow transmission band, for example, 200 cycles wide, centered at 36 kc. p.s. The output of the filter is applied to an amplitude detector 14 and a 25 c.p.s. phase detector 17 connected in that order. The phase reference for the phase detector 17 is taken from a 25 c.p.s. source terminal 18. The output of phase detector 17 is applied through a resistor 19 to an integrator 21, and the integrated output is in turn applied through a conductor 23 to a proportioning circuit 22. The instrument output may be taken from conductor 23, the direct potential thereof being substantially proportional to the median frequency of the Doppler signal input spectrum. Alternatively, the mean oscillator 27 frequency may be measured.

The input applied to the proportioning circuit 22 from the integrator 21 consists of direct current of a selected polarity having a variable level. The proportioning circuit 22 is also provided with an alternating current input applied over conductor 24. The function of the proportioning circuit is to emit at its conductor 26 a direct current modulated by the alternating current whose amplitude is a selected constant fraction of the direct current amplitude. This proportioning circuit 22 is described in U.S. Patent No. 2,915,748 issued December 1, 1959.

The output conductor 26 is connected to an oscillator 27 which is adjustable over a wide range in an approximately linear manner under the control of the voltage level existing on conductor 26. The oscillator has such frequency range that when its output modulates the incoming Doppler signal the lower sideband can be made to have a frequency of 36 kc. p.s. The oscillator output 28 is applied as the second or heterodyning input of modulator 11.

The components so far described include essential parts of one form of frequency tracker loop. In the operation of this loop, a signal spectrum applied at conductor 12 has, for example, an approximately Gaussian form with a midfrequency of 14 kc. p.s. and a width between 3 db points of 12% of the midfrequency. The range of input center frequency is, typically, from 1.3 kc. p.s. to 24 kc. p.s., being proportional to the aircraft speed.

When the input signal center frequency is 14 kc. p.s., the average frequency of the oscillator 27 should be 50 kc. p.s. except for loop error. However, the 25 c.p.s. modulation of the direct current control of the oscillator produces an excursion of the oscillator frequency of ±6%, or between 47 kc. p.s. and 53 kc. p.s., so that the difference sideband applied to the filter 13 also moves in frequency, dwelling at 33 kc. p.s. during one half-cycle of the 25 c.p.s. period and at 39 kc. p.s. during the other half-cycle. Thus, when this moving difference sideband is exactly centered about 36 kc. p.s. the output of the filter, at 36 kc. p.s., has exactly the same amplitude during both half-cycles, but when the sideband is inexactly centered the filter output varies in amplitude at the 25 cycle rate. This 25 cycle component, when it exists, is amplitude detected at detector 17 to form a direct current error signal $e_{FT}$ at resistor 19. The integral of this signal at conductor 23 is used to readjust the oscillator 27 in such direction as to reduce the error signal $e_{FT}$ to zero, whereupon the integrator 21 maintains the oscillator at its then existing output frequency, the mean of which is exactly equal to the Doppler signal median frequency plus 36 kc. p.s.

The 25 c.p.s. power supply at terminal 18 preferably has a square waveform, and such a waveform will be assumed in describing the operation of this invention. A second power supply at 125 c.p.s. is provided at terminal 29 which may have any waveshape, but a sinusoidal form will be assumed for purposes of discussion herein. The two power inputs are combined without intermodulation in an adder 31 to form a composite alternating current supply in conductor 24.

A 125 c.p.s. phase detector 32 is phase-referenced by the power supply energy impressed on terminal 29 and is additionally supplied with a signal derived from the output of detector 14. The output of the phase detector 32 is gated at a 25 c.p.s. rate by a gate 36. This gate is controlled by the 25 c.p.s. power imposed through conductor 37 in such a way that it is conductive during positive half-cycles of the 25 c.p.s. square wave, and nonconductive during the negative half-cycles.

The gate 36 output is smoothed in a low-pass filter 38, and is then applied to one end terminal 41 of a multiplier consisting of a potentiometer 39. The other input of the multiplier consists of a mechanical connection 42 moving the slider 43. This mechanical connection 42 connects the slider 43 to the shaft output of a position servomechanism 44 which is in turn actuated by the local oscillator output applied to conductor 28. The servomechanism 44 is designed to position the shaft 42 at an angular deflection which is proportional to the average frequency, $f_o$, of the signal in conductor 28. The inertia of the servomechanism smooths the local oscillator frequency to produce a constant shaft position.

A servomechanism such as disclosed in U.S. Patent No. 2,584,866 may advantageously be used for this purpose.

The potential on slider 43 is applied to an algebraic adding device which includes the several resistors, 46, 47 and 19, all connected to the input conductor 48 of the integrating amplifier 21. This common form of adding device is described in the Radiation Laboratory Series, Volume No. 21, entitled Electronic Instruments, on page 33.

The resistor 47 is connected to a potentiometer 49 having a positive potential source connected to its terminal 51. Since the signal applied from slider 43 is always negative, the potentiometer 49 constitutes a device for subtracting therefrom a quantity determined by the manual adjustment of the knob 52.

Figure 2:
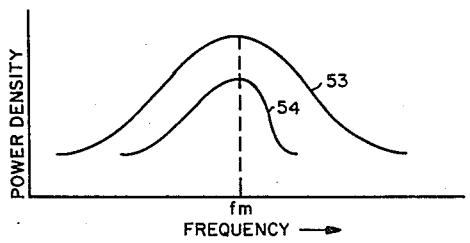
FIGURES 2, 3 and 7 are characteristic curves of Doppler spectral returns from land and water surfaces.

In the operation of the circuit of FIGURE 1, let it be assumed that the Doppler signal input applied to conductor 12 is derived from a land echo. Its frequency spectrum is roughly Gaussian in form as indicated in FIGURE 2 at 53. When, on the other hand, the signal is derived from a water echo it is reduced in amplitude with the returns at frequencies below the median frequency, $f_m$, being reduced less than are those above $f_m$, resulting in the skewed shape 54. The center of area of form 54 is then lower in frequency than frequency $f_m$.

Figure 3:
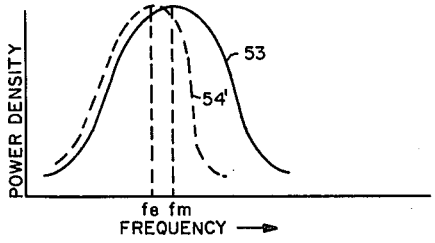

When the curve 54, FIGURE 2, is increased in amplitude as is in fact effected by an automatic gain control circuit preceding or contained within the frequency tracker, so that the average or peak amplitudes are equal, the lower-frequency side of curve 54 has less slope than that of curve 53 while the higher-frequency side has a steeper slope. This is shown in FIGURE 3, in which dashed curve 54' is the curve 54, FIGURE 2, amplified to a peak level equal to that of the spectrum 53.

Figure 4:
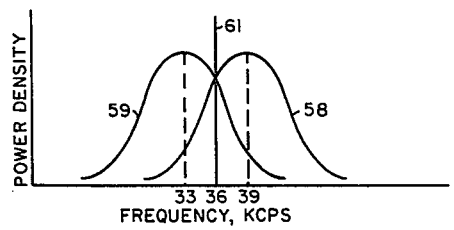

Now assume, as before, that the input Doppler signal at conductor 12, FIGURE 1, has a center frequency of 14 kc. p.s. The oscillator 27 has an average frequency of 50 kc. p.s. modulated at 25 c.p.s. with an excursion of ±3 kc. p.s. so that the two lower sideband spectra applied to the filter 13 are as shown in FIGURE 4. The two sidebands alternated at 25 c.p.s. are designated by the reference characters 58 and 59 while the line 61 represents the filter frequency, the loop being exactly balanced.

Instead of visualizing the two Gaussian spectra, 58 and 59, of FIGURE 4, as existing alternately on a 25 c.p.s. time-shared basis, it is convenient to draw a single spectrum, 62, FIGURE 5, with two filter positions 63 and 64 occupied alternately in time by the filter transmission band at the 25 c.p.s. rate. In other words the same relations can be visualized either from the standpoint of two spectra alternating in frequency displacement about a fixed frequency filter or as a single fixed frequency spectrum with filter frequency varying in its position with respect to the single spectrum.

Figure 6:
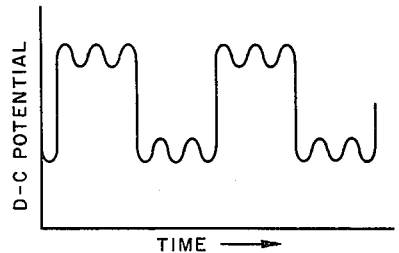
FIGURES 6, 8 and 9 are curves illustrating the operation of the invention in distinguishing between land and water reflection.

The local oscillator 27, FIGURE 1, is actually frequency modulated at 25 and 125 c.p.s. rates simultaneously, so that there actually exists the modulating signal depicted in FIGURE 6. Therefore the 200-cycle-wide band pass positions 63 and 64, FIGURE 5 are in effect moved back and forth, each during its 1/50 second time, over the excursion caused by the 125 c.p.s. modulation and shown as heavy lines 68 and 69. As drawn, the graph 62 is symmetrical, and the amplitudes traced on the ordinate scale by the excursions 68 and 69 are identical and shown as an amplitude variation 71. This is the case when the return is from overland operation.

Figure 7:
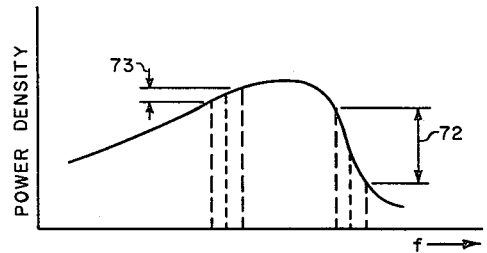

However, when the graph 62 is skewed due to water reflection, as shown to an exaggerated degree in FIGURE 7, the excursion on the steep slope produces the amplitude variation 72 while the excursion on the lesser slope produces only the variation 73.

When the spectrum is symmetrical and the speed changes, but the frequency tracker loop has not had time to change the local oscillator frequency, the filter frequency 61, FIGURE 4 is no longer at the crossover point of forms of 59 and 58. Depicted as in FIGURE 5, the average power densities of the graph portions 68 and 69 are no longer equal, and a 25 c.p.s. error signal is thereby produced. This signal is formed at the output of detector 14 and is similar to that shown by the graph of FIGURE 6. The 25 c.p.s. error signal is applied to the 25 c.p.s. phase detector 17, causing the loop to rebalance itself by adjusting the oscillator 27.

At the same time, the signal is applied to the 125 c.p.s. phase detector 32 and phase detection there produces a direct potential in conductor 74 which, for overland operation, has the same amplitude during both halves of the 25 c.p.s. period, this amplitude being proportional to the amplitude variation 71, FIGURE 5. Half of this potential is applied through the gate 36 and filter 38 to the multiplier terminal 41.

One of the characteristics of a Doppler echo signal spectrum is that its width is proportional to its center frequency, and because of this the slopes of its sides are inversely proportional to its center frequency. The corrective, or land-water, signal developed in this circuit is a measure of the difference in slope of one of the Doppler signal spectrum sides, this difference in slope being caused by the skewness of the spectrum caused by overwater operation. It therefore is necessary to remove the change in slope caused by aircraft speed change which otherwise mask the effect sought. This is done by multiplying the voltage, E, applied by the filter 38 to terminal 41, by a factor representing the aircraft speed S, this factor S being the amount of angular deflection of the shaft 42. That is, $$EkS = y \quad (2)$$

in which $k$ is the scale factor of the servomechanism 44. The product $y$ is a constant $e_L$ in overland operation because of the inverse relationship between E and S.

It is necessary in overland operation to reduce to zero the effect of the constant $e_L$ at the input 48 of the integrator 21, so that in such operation the accuracy of the main frequency tracker loop will be unimpaired. This is done by adding to conductor 48 a potential equal in amount and opposite in sign to the potential $e_L$. In order to do this, during overland operation the knob 52 is adjusted to a potential $c$, such that the total potential $e_c$, applied from these two sources to the integrator is zero. That is, $$e_L - c = e_c = 0 \quad (3)$$

The only error potential applied to the integrator is then that applied through resistor 19 from the main loop phase detector 17.

Figure 8:
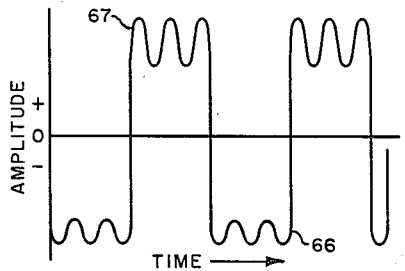
Figure 9:
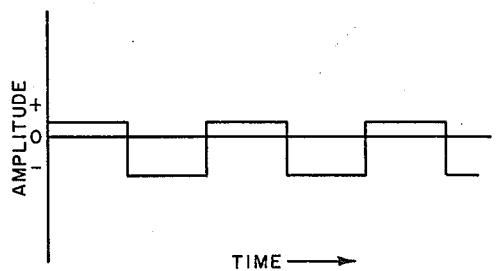

When the spectrum is skewed as shown in FIGURE 7 for operation over water, the demodulated output of detector 14 is as shown in FIGURE 8. During one half-cycle the 125-cycle component 67 has large amplitude because the amplitude variation 72, FIGURE 7, is large, and during the remainder of the cycle 66, FIGURE 8, the 125-cycle component is small because the variation 73, FIGURE 7, is small. When phase detected at detector 32, FIGURE 1, the output in conductor 74 is as shown in FIGURE 9, varying at the 25 c.p.s. rate. The 25 c.p.s. gate 36, FIGURE 1, selects the higher amplitude parts of the graph of FIGURE 9, since it is conductive only during these half-cycles and is otherwise non-conductive. The resulting signal is smoothed by the low-pass filter 38 and is applied to the multiplier 39. Since the combined outputs of resistors 46 and 47 have been adjusted for zero output with the lower input from the land signal, they now have other than zero output. This constitutes an error output $e_c$. That is $$e_w - c = e_c \neq 0 \quad (4)$$

in which $e_w$ is the signal applied, in overwater operation, to resistor 46. The negative potential constituting signal $e_c$ is combined in the adding circuit with the main loop signal $e_{FT}$ from resistor 19, to form a composite error signal $e$, which is applied to the integrator 21. The operation of the main loop now causing the error signal $e$ to become or approach zero, the output $e_{FT}$ of phase detector 17 is found to assume some value other than zero and equal, in fact, to $e_c$ but of opposite sign. It follows that at null over water the average frequency of the oscillator 27 is slightly different from what it would be without the operation of the correction loop including resistor 46. The direct potential output of the instrument at conductor 23 is correspondingly different. This difference caused by the correction loop is of such sign and amount that the resulting output potential at conductor 23, over water, is the same as it would be in overland operation. That is, the outputs over land and over water are substantially identical.

From the above it will be apparent that the apparatus of the inventor operates to measure the slope of a portion of the Doppler spectrum and from this measurement develops an error signal which corrects for the calibration error introduced when operating over water areas. It will be apparent to one skilled in the art that the measurement of Doppler spectrum slope may also be used as an indication that the craft is passing over the shore line. Also in overwater operation the amount of Doppler spectrum slope may be utilized to indicate the sea state of the water beneath the aircraft. Still more generally, the apparatus may be employed to detect and to correct for any asymmetry in the Doppler frequency spectrum as applied to the freqency tracker, from whatever cause arising.

What is claimed is:

1. A device of the class described comprising, frequency tracker means having a Doppler spectrum of frequencies impressed thereon and producing therefrom an output signal representative of the center frequency of said Doppler spectrum of frequencies, means connected to said frequency tracker means for producing a land-water signal the magnitude of which is proportional to the slope of a selected portion of said Doppler spectrum, and means operated by the departure of said land-water signal from a preselected value for varying said output signal by an incremental amount of the magitude of which is proportioned to the departure of said land-water signal from said preselected value.

2. A device of the class described comprising, a modulator having a Doppler spectrum of signals applied thereto, a local oscillator having its output impressed on said modulator, means for frequency modulating said local oscillator at a first frequency, means for frequency modulating said local oscillator at a second frequency higher than said first frequency, a resonant filter connected to the output of said modulator, means connected to said resonant filter operated at said first frequency for producing a first error signal representative of the departure of the average modulator output frequency from the resonant frequency of said filter, means connected to said resonant filter operated at said second frequency for producing a second error signal proportional to the slope of a selected portion of said Doppler spectrum, summing means having said first error signal and a selected portion of said second error signal imposed thereon and producing a composite error signal therefrom, and means correcting the mean frequency of said local oscillator by said composite error signal.

3. A device of the class described comprising, a modulator having a Doppler spectrum of signals applied thereto, a local oscillator having its output impressed on said modulator, means for frequency modulating said local oscillator at a first frequency, means including a phase detector referenced to said first frequency for producing a first error signal, means for frequency modulating said local oscillator at a second frequency higher than said first frequency, means including a second phase detector referenced to said second frequency for producing a second error signal the amplitude of which is proportional to the slope of a portion of said Doppler spectrum, summing means having said first error signal and a selected portion of said second error signal imposed thereon and producing a composite error signal therefrom, and means for changing the mean frequency of said local oscillator in accordance with said composite error signal.

4. A device of the class described, comprising a modulator having a Doppler spectrum of signals applied thereto, a local oscillator having its output impressed on said modulator, means for frequency modulating said local oscillator at a first frequency, means for frequency modulating said local oscillator at a second frequency higher than said first frequency, a resonant filter connected to the output of said modulator, means including a phase detector referenced to said first frequency and connected to the output of said resonant filter for producing a first error signal representative of the departure of the average modulator output frequency from the resonant frequency of said filter, means including a second phase detector referenced to said second frequency and connected to the output of said resonant filter for producing a second error signal the amplitude of which is proportional to the slope of a portion of said Doppler spectrum, summing means having said first error signal, a selected portion of said second error signal and a datum signal imposed thereon and producing a composite error signal therefrom, and means for changing the mean frequency of said local oscillator in accordance with said composite error signal.

5. A device of the class described, comprising a modulator having a Doppler spectrum of signals applied thereto, a local oscillator having its output impressed on said modulator, means for frequency modulating said local oscillator at a first frequency, means for frequency modulating said local oscillator at a second frequency higher than said first frequency, a resonant filter connected to the output of said modulator, means demodulating the output of said resonant filter, means including a phase detector referenced to said first frequency and connected to the output of said demodulating means for producing a first error signal representative of the departure of the average modulator frequency from the resonant frequency of said filter, means including a second phase detector referenced to said second frequency and connected to the output of said demodulating means for producing a second error signal the amplitude of which is proportional to the slope of a portion of said Doppler spectrum, summing means having said first error signal, a selected portion of said second error signal and a datum signal imposed thereon and producing a composite error signal therefrom, and means for changing the mean frequency of said local oscillator in accordance with said composite error signal.

6. A device of the class described, comprising a modulator having a Doppler spectrum of signals applied thereto, a local oscillator having its output impressed on said modulator, means for frequency modulating said local oscillator at a first frequency, means for frequency modulating said local oscillator at a second frequency higher than said first frequency, a resonant filter connected to the output of said modulator, means demodulating the output of said resonant filter, means including a phase detector referenced to said first frequency and connected to the output of said demodulating means for producing a first error signal representative of the departure of the average modulator frequency from the resonant frequency of said filter, means including a second phase detector referenced to said second frequency and connected to the output of said demodulating means for producing a second error signal the amplitude of which is proportional to the slope of a portion of said Doppler spectrum, means for multiplying said second error signal by a factor representative of the mean frequency of said local oscillator to form a corrected second error signal, summing means having said first error signal, said corrected second error signal and a datum signal imposed thereon and producing a composite error signal therefrom, and means for changing the mean frequency of said local oscillator in accordance with said composite error signal.

7. A corrector for Doppler navigation overland and overwater operation comprising, a modulator having a Doppler spectrum of signals applied thereto, a local oscillator having its output impressed on said modulator, means for frequency modulating said local oscillator at a first frequency, means for frequency modulating said local oscillator at a second frequency higher than said first frequency, a resonant filter connected to the output of said modulator, means demodulating the output of said resonant filter, means including a phase detector referenced to said first frequency and connected to the output of said demodulating means for producing a first error signal representative of the departure of the average modulator frequency from the resonant frequency of said filter, means including a second phase detector referenced to said second frequency and connected to the output of said demodulating means for producing a second error signal the amplitude of which is proportional to the slope of a portion of said Doppler spectrum, means for multiplying said second error signal by a factor representative of the mean frequency of said local oscillator to form a corrected second error signal, means generating a correction signal representative of overland operation, adding means for algebraically adding said first error signal, said corrected second error signal and said correction signal to form a sum signal, an integrator having said sum signal applied thereto, and means applying the integrated output signal of said integrator to said local oscillator.

8. A device of the class described comprising, a modulator having a Doppler spectrum of signals applied thereto, a local oscillator having its output impressed on said modulator, means producing a first error signal representative of the departure of the average modulator output frequency from a selected fixed value, means producing a second error signal proportional to the slope of a selected portion of said Doppler spectrum, summing means having said first error signal, a selected portion of said second error signal and a selected datum signal imposed thereon and producing a composite error signal therefrom, and means for changing the frequency of said local oscillator by said composite error signal.

9. A device of the class described comprising, a modulator having a Doppler spectrum of signals applied thereto, a local oscillator having its output impressed on said modulator, means producing a first error signal representative of the departure of the average modulator output frequency from a selected fixed value, means producing a second error signal proportional to the slope of a selected portion of said Doppler spectrum, means multiplying said second error signal by a factor representative of the frequency of said local oscillator to provide a corrected second error signal, summing means having said first error signal, said corrected second error signal and a selected datum signal imposed thereon and producing a composite error signal therefrom, and means for changing the frequency of said local oscillator by said composite error signal.

No references cited.